US010668654B2

(12) United States Patent
Koonankeil

(10) Patent No.: US 10,668,654 B2
(45) Date of Patent: Jun. 2, 2020

(54) METHOD FOR DISPOSING A BLOCKING MATERIAL

(71) Applicant: UNITED TECHNOLOGIES CORPORATION, Hartford, CT (US)

(72) Inventor: James M Koonankeil, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1117 days.

(21) Appl. No.: 14/610,001

(22) Filed: Jan. 30, 2015

(65) Prior Publication Data
US 2016/0221124 A1 Aug. 4, 2016

(51) Int. Cl.
B29C 45/00 (2006.01)
B29C 45/14 (2006.01)
B23P 15/16 (2006.01)
B23K 26/40 (2014.01)
B23K 26/382 (2014.01)
B23K 26/00 (2014.01)
B23K 26/18 (2006.01)
B23P 15/02 (2006.01)
(Continued)

(52) U.S. Cl.
CPC ...... B29C 45/14344 (2013.01); B23K 26/009 (2013.01); B23K 26/18 (2013.01); B23K 26/389 (2015.10); B23K 26/40 (2013.01); B23P 15/02 (2013.01); B23P 15/16 (2013.01); B29C 35/0805 (2013.01); B23H 9/10 (2013.01); B23H 9/14 (2013.01); B23K 2101/001 (2018.08); B23K 2103/26 (2018.08); B23P 2700/06 (2013.01); B29C 2035/0838 (2013.01); B29K 2023/04 (2013.01); B29L 2031/082 (2013.01); F01D 5/186 (2013.01); F05D 2230/13 (2013.01)

(58) Field of Classification Search
CPC ................................. B29C 45/14344
See application file for complete search history.

(56) References Cited

U.S. PATENT DOCUMENTS 4,873,414 A 10/1989 Ma et al.
5,140,127 A 8/1992 Stroud et al.
(Continued)

FOREIGN PATENT DOCUMENTS

EP 1 002 617 5/2000
EP 2 540 430 1/2013

OTHER PUBLICATIONS

European search report for Application No. 16153085.2-1709 dated Jun. 2, 2016.

Primary Examiner — Timothy Kennedy
(74) Attorney, Agent, or Firm — Bachman & LaPointe, P.C.

(57) ABSTRACT

A method for disposing blocking material within an interior of a component for blocking a beam of radiation from a laser during a laser drilling operation, the method including forming one of a multiple of apertures formed via a first process and forming the remainder of the multiple of apertures formed via a laser drilling process. A component for a gas turbine engine includes a surface with at least one of a multiple of apertures formed via a first process, the at least one of the multiple of apertures formed via the first process in communication with a cavity, a remainder of the multiple of apertures formed via a laser drilling process, the remainder of the multiple of apertures in communication with the cavity.

6 Claims, 5 Drawing Sheets

(51) Int. Cl.

| | |
|---|---|
| *B29C 35/08* | (2006.01) |
| *F01D 5/18* | (2006.01) |
| *B23H 9/10* | (2006.01) |
| *B23H 9/14* | (2006.01) |
| *B23K 103/18* | (2006.01) |
| *B23K 101/00* | (2006.01) |
| *B29L 31/08* | (2006.01) |

(56) References Cited

U.S. PATENT DOCUMENTS

| | | | |
|---|---|---|---|
| 5,902,647 | A | 5/1999 | Venkataramani et al. |
| 5,914,060 | A | 6/1999 | Flis et al. |
| 5,928,534 | A | 7/1999 | Flis et al. |
| 6,251,315 | B1 | 6/2001 | Reed et al. |
| 6,329,633 | B1 | 12/2001 | Lamm et al. |
| 7,067,447 | B2 | 6/2006 | Campbell |
| 7,186,085 | B2 * | 3/2007 | Lee .................. F01D 5/186 416/97 R |
| 7,302,992 | B2 | 12/2007 | Chang et al. |
| 7,841,084 | B2 | 11/2010 | Meier |
| 8,710,392 | B2 | 4/2014 | Mironets et al. |
| 2009/0274550 | A1 | 11/2009 | Meier |
| 2013/0001203 | A1 | 1/2013 | Mironets et al. |
| 2014/0205461 | A1 | 7/2014 | Cheah |

\* cited by examiner

METHOD FOR DISPOSING A BLOCKING MATERIAL

BACKGROUND

The present disclosure relates to a method for disposing blocking material into a component having internal passages, and more particularly to a method for disposing laser blocking material within an interior of an airfoil.

Gas turbine engines typically include a compressor section to pressurize airflow, a combustor section to burn a hydrocarbon fuel in the presence of the pressurized air, and a turbine section to extract energy from the resultant combustion gases. Gas path components, such as turbine blades, often include cooling that may be accomplished by external film cooling, internal air impingement, and forced convection either separately or in combination. In forced convection cooling, compressor bleed air flows through internal chambers to continuously remove thermal energy. The compressor bleed air enters the internal chambers through one or more inlets to the internal chambers, which then discharge though various aperture exits.

Advances in manufacturing have facilitated significantly smaller and more complex internal passages. The cooling air holes are drilled in pre-determined patterns and are contoured to ensure adequate cooling of the airfoil. The cooling air holes duct cooling air from passages on the interior of the airfoil through the hot walls to the exterior. The cooling air provides transpiration cooling as the air passes through the wall and, after the air is discharged from the airfoil, provides film cooling with a film of air on the exterior. The film of cooling air provides a barrier between the airfoil and the hot, working medium gasses.

One process to drill the holes utilizes a laser beam that burns through the wall of the airfoil to form a hole that provides a satisfactory conduit for cooling air. As the laser beam penetrates through the airfoil wall into an interior cavity, the laser beam may strike adjacent structure on the other side of the cavity that may cause unacceptable damage to the airfoil. Accordingly, blocking material may be disposed in the cavity to block the laser beam from striking walls that bound the cavity after the laser beam penetrates through the airfoil wall.

The relatively smaller and more complex passages complicate, if not prevent, the adequate injection of backing materials that fill all internal voids to protect from wall strikes and through wall breakthroughs associated with the laser hole drilling process. One process that attempts to overcome this complication relies solely on the control of filling material temperature and injection pressure, which may not be sufficient for parts with small cavities and complex internal features. Another process relies on controlling injection pressure and part orientation to move entrapped gases within the internal cavities. This process may also not be sufficient for parts with small cavities, complex internal features, nor those that dead-end.

SUMMARY

A method for disposing a blocking material within an interior of a component, the method according to one disclosed non-limiting embodiment of the present disclosure includes forming one of a multiple of apertures in communication with a cavity within a component via a first process; and forming the remainder of the multiple of apertures in communication with the cavity within the component via a second process different than the first process.

A further embodiment of the present disclosure includes, wherein the second process is a laser drilling process.

A further embodiment of any of the foregoing embodiments of the present disclosure includes filling the cavity with a blocking material subsequent to forming one of the multiple of apertures formed via the first process and prior to forming the remainder of the multiple of apertures formed via the second process.

A further embodiment of any of the foregoing embodiments of the present disclosure includes, wherein the multiple of apertures are cooling holes that communicate with a single cavity within a turbine blade.

A further embodiment of any of the foregoing embodiments of the present disclosure includes filling the cavity with a blocking material subsequent to forming one of the multiple of apertures formed via the first process and prior to forming the remainder of the multiple of apertures formed via the second process.

A further embodiment of any of the foregoing embodiments of the present disclosure includes forming the one of the multiple of apertures formed via the first process a maximum distance from where the blocking material is injected into the cavity.

A further embodiment of any of the foregoing embodiments of the present disclosure includes filling the cavity with a blocking material until the blocking material at least partially excretes through the one of the multiple of apertures formed via the first process.

A further embodiment of any of the foregoing embodiments of the present disclosure includes forming the one of the multiple of apertures formed via the first process a maximum distance from where a blocking material is injected into the cavity.

A method for disposing a blocking material within an interior of a component, according to another disclosed non-limiting embodiment of the present disclosure includes forming one of a multiple of apertures in communication with a cavity via a first process; filling the cavity with a blocking material subsequent to forming the one of the multiple of apertures formed via the first process; and forming the remainder of the multiple of apertures in communication with the cavity via a second process subsequent to filling the cavity with the blocking material.

A further embodiment of any of the foregoing embodiments of the present disclosure includes forming the one of the multiple of apertures formed via the first process a maximum distance from where the blocking material is injected into the cavity.

A further embodiment of any of the foregoing embodiments of the present disclosure includes forming the one of the multiple of apertures formed via the first process at a location to facilitate egress of gasses from the blocking material.

A further embodiment of any of the foregoing embodiments of the present disclosure includes forming the one of the multiple of apertures formed via the first process at a location to provide a vent for the blocking material.

A further embodiment of any of the foregoing embodiments of the present disclosure includes, wherein the cavity is a dead end cavity.

A further embodiment of any of the foregoing embodiments of the present disclosure includes, wherein the cavity includes a multiple of chambers, each of the chambers including one of the multiple of apertures formed via the first process.

A further embodiment of any of the foregoing embodiments of the present disclosure includes, forming one of the multiple of apertures formed via the first process via an EDM process.

A component for a gas turbine engine according to another disclosed non-limiting embodiment of the present disclosure includes a surface with at least one of a multiple of apertures formed via a first process, the at least one of the multiple of apertures formed via the first process in communication with a cavity, a remainder of the multiple of apertures formed via a second process different than the first process, the remainder of the multiple of apertures in communication with the cavity.

A further embodiment of any of the foregoing embodiments of the present disclosure includes, wherein the component is a turbine blade.

A further embodiment of any of the foregoing embodiments of the present disclosure includes, wherein the surface includes a leading edge.

A further embodiment of any of the foregoing embodiments of the present disclosure includes, wherein the cavity is one of a multiple of chambers.

A further embodiment of any of the foregoing embodiments of the present disclosure includes, wherein the second process is a laser drilling process.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
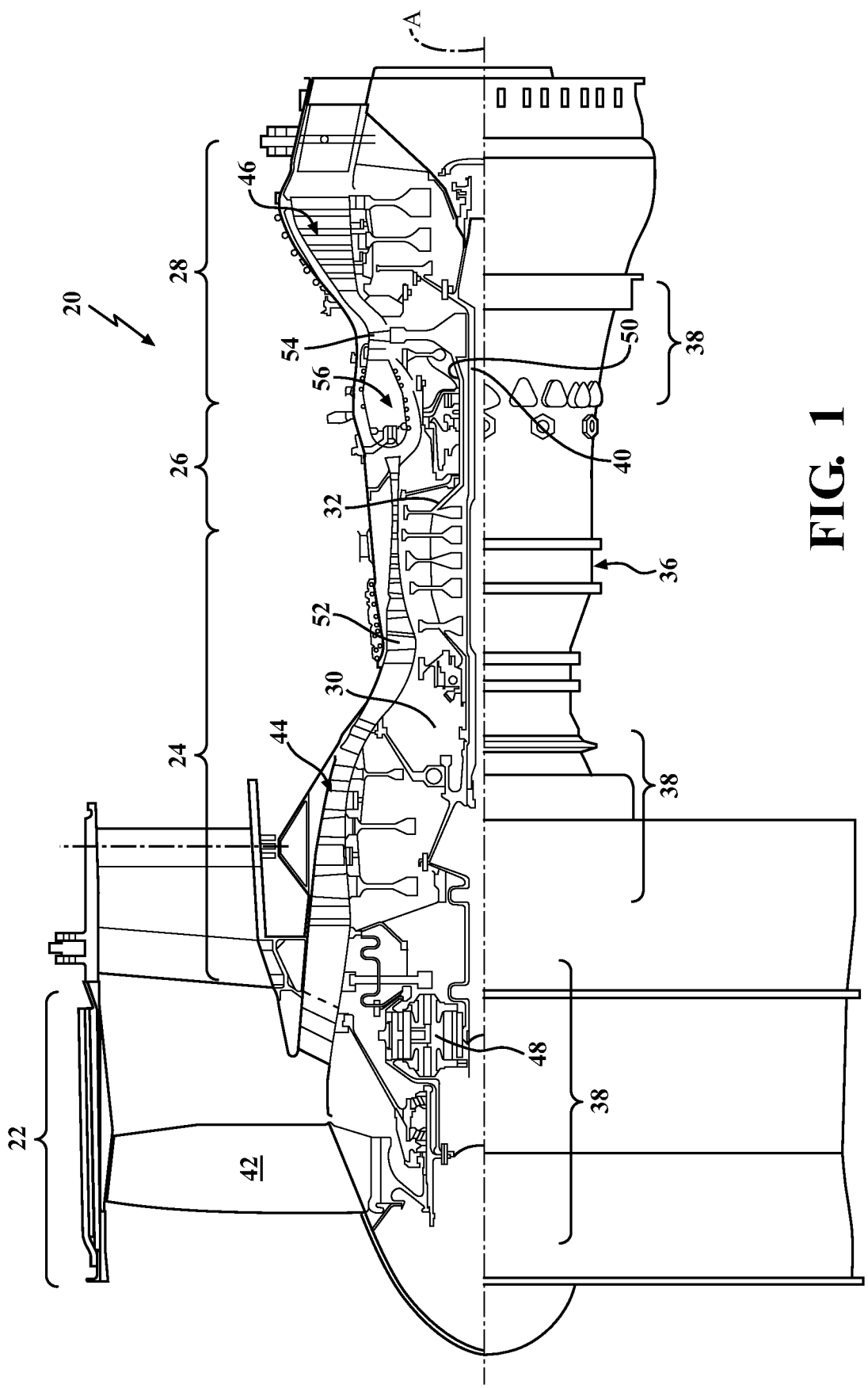
FIG. 1 is a schematic cross-section of an example gas turbine engine architecture.
Figure 2:
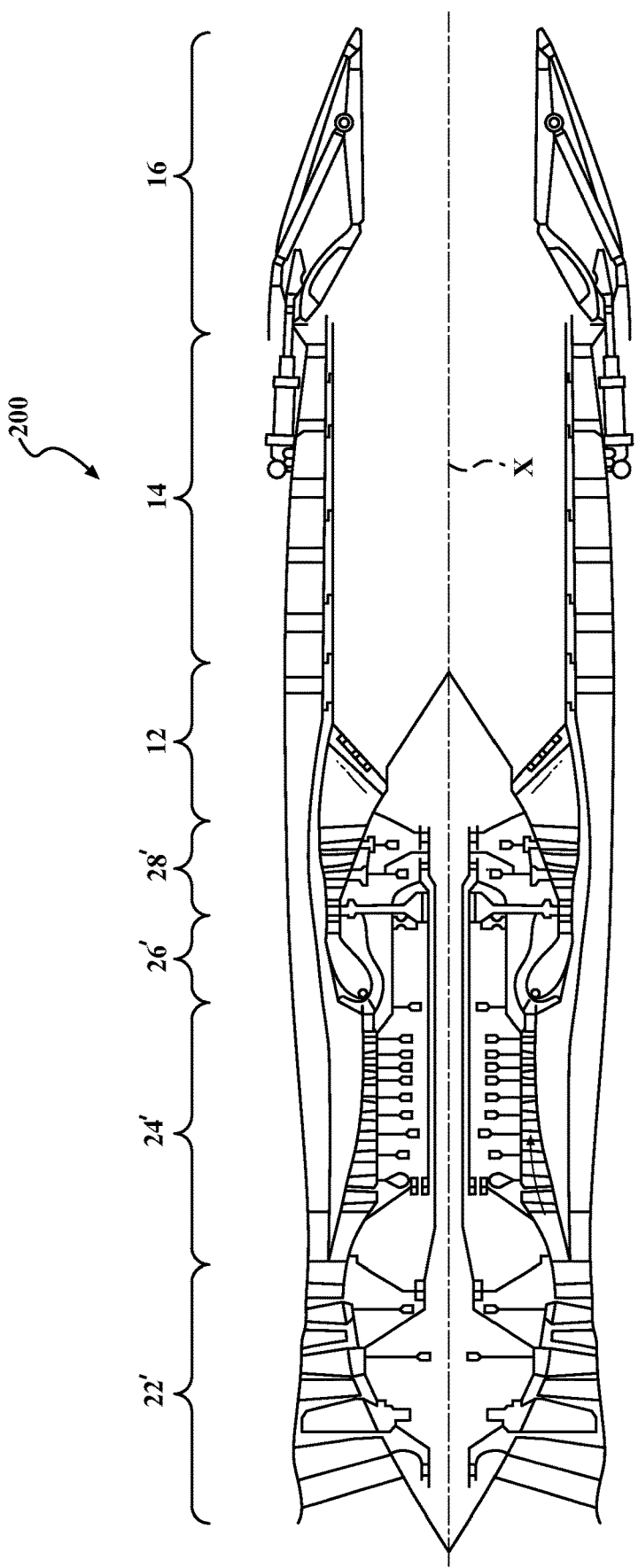
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 (FIG. 2) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis X relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis X which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

Figure 3:
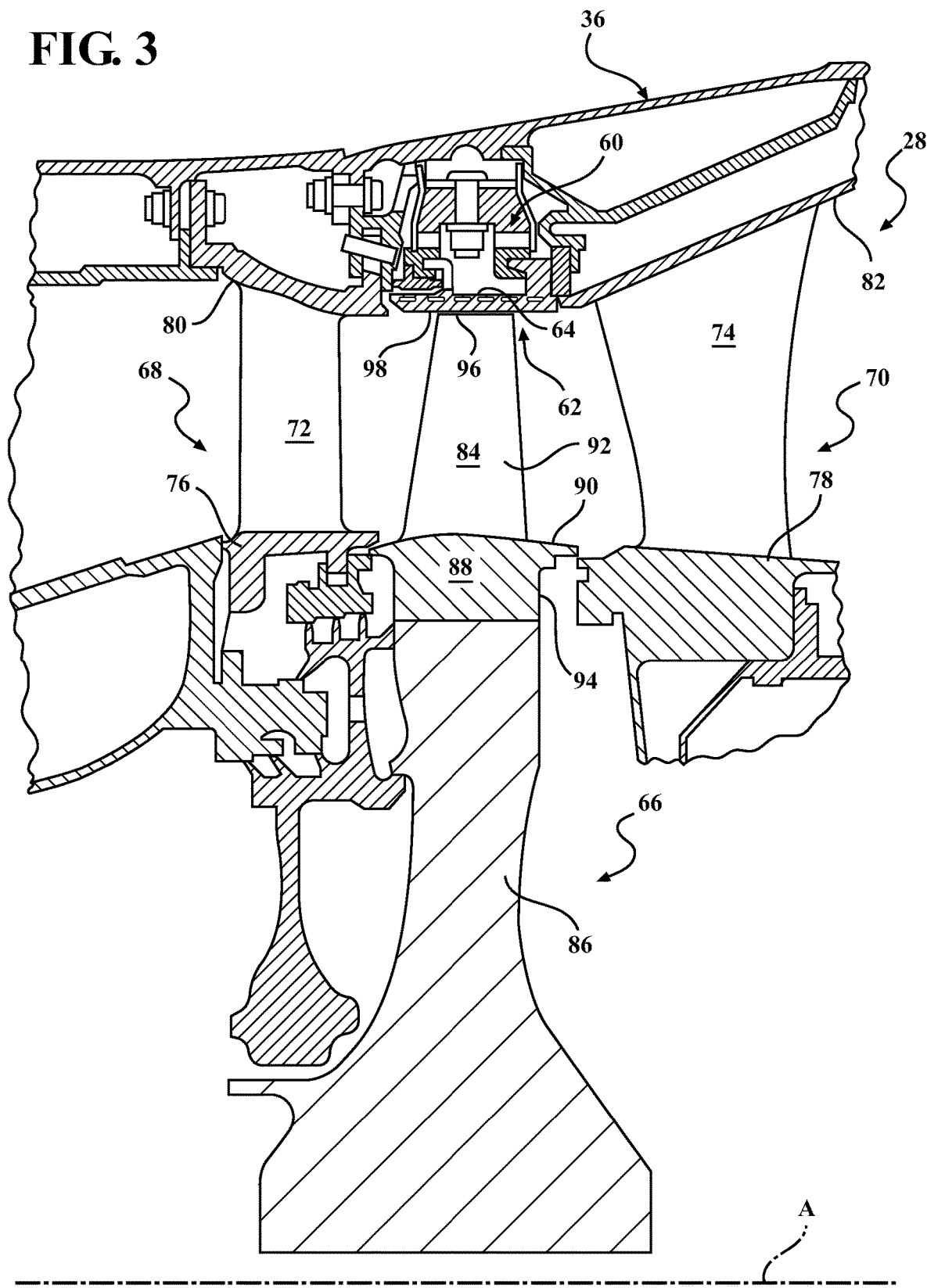
FIG. 3 is an enlarged schematic cross-section of an engine turbine section.

With reference to FIG. 3, an enlarged schematic view of a portion of the turbine section 28 is shown by way of example; however, other engine sections will also benefit herefrom. A full ring shroud assembly 60 within the engine case structure 36 supports a blade outer air seal (BOAS) assembly 62 with a multiple of circumferentially distributed BOAS 64 proximate to a rotor assembly 66 (one schematically shown).

The full ring shroud assembly 60 and the BOAS assembly 62 are axially disposed between a forward stationary vane ring 68 and an aft stationary vane ring 70. Each vane ring 68, 70 includes an array of vanes 72, 74 that extend between a respective inner vane platform 76, 78 and an outer vane platform 80, 82. The outer vane platforms 80, 82 are attached to the engine case structure 36.

The rotor assembly 66 includes an array of blades 84 circumferentially disposed around a disk 86. Each blade 84 includes a root 88, a platform 90 and an airfoil 92 (also shown in FIG. 4). The blade roots 88 are received within a rim 94 of the disk 86 and the airfoils 92 extend radially outward such that a tip 96 of each airfoil 92 is closest to the blade outer air seal (BOAS) assembly 62. The platform 90 separates a gas path side inclusive of the airfoil 92 and a non-gas path side inclusive of the root 88.

Figure 4:
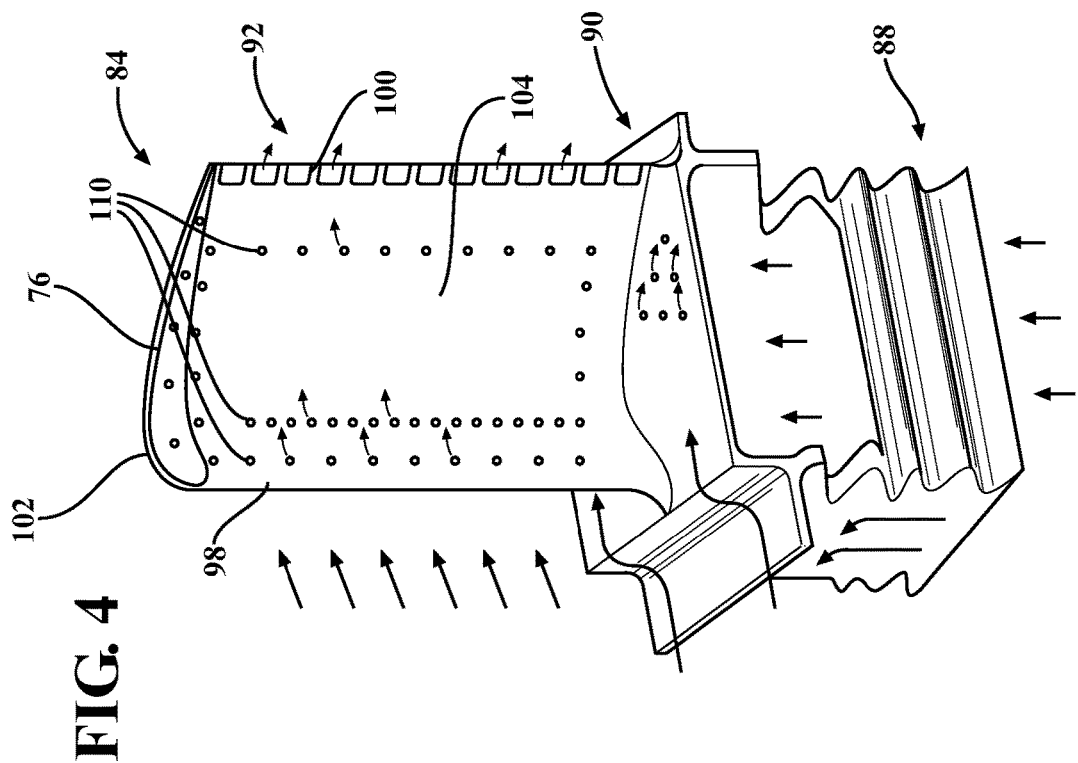
FIG. 4 is a perspective view of an airfoil as an example component.

With reference to FIG. 4, the platform 90 generally separates the root 88 and the airfoil 92 to define an inner boundary of a gas path. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90. It should be appreciated that the tip 96 may include a recessed portion.

Figure 5:
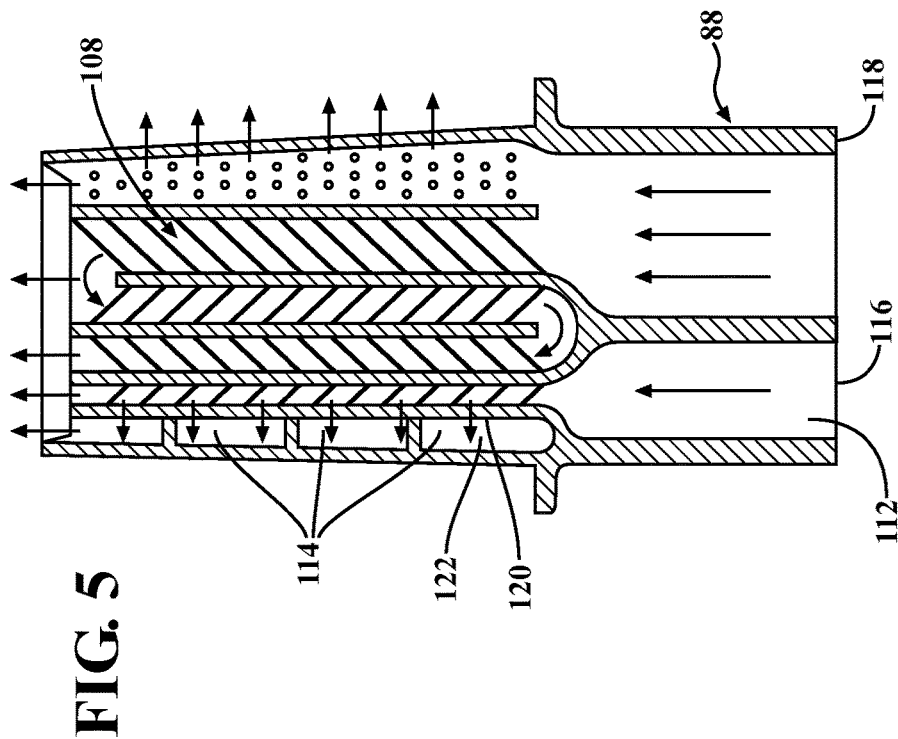
FIG. 5 is a schematic cross-section view of the airfoil of FIG. 4 showing the internal architecture.
Figure 6:
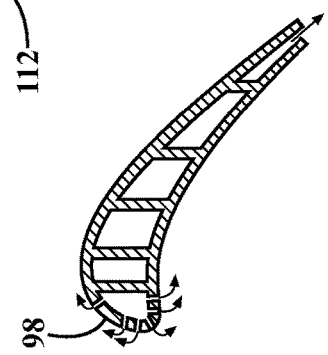
FIG. 6 is a schematic lateral cross-section view of the airfoil of FIG. 4.

To resist the high temperature stress environment in the gas path of a turbine engine, each blade 84 may be formed by casting and include an array of internal passageways 108 (shown schematically; FIG. 5) that communicate with a multiple of apertures 110 (illustrated schematically) that direct cooling air over an outer surface of the airfoil 92, here exemplified by the leading edge 98 (FIG. 6). It should be appreciated that although a blade 84 with cooling holes will be described and illustrated in detail as one example, other components including, but not limited to, vanes, turbine shrouds, end walls and other components that are manufactured with use of a blocking material will also benefit herefrom.

With reference to FIG. 5, the array of internal passageways 108 includes a feed passage 112 that communicates airflow into a multiple of leading edge chambers 114 within the airfoil 84. The feed passage 112 generally receives cooling flow through at least one inlet 116 within a base 118 of the root 88. It should be appreciated that the array of internal passageways 108 may include various geometries, numbers and configurations and the feed passage 112 in this embodiment is but one passage that communicates cooling air to the multiple of leading edge chambers 114. The multiple of leading edge chambers 114 generally receives cooling flow from the feed passage 112 through respective crossover passages 120.

Figure 7:
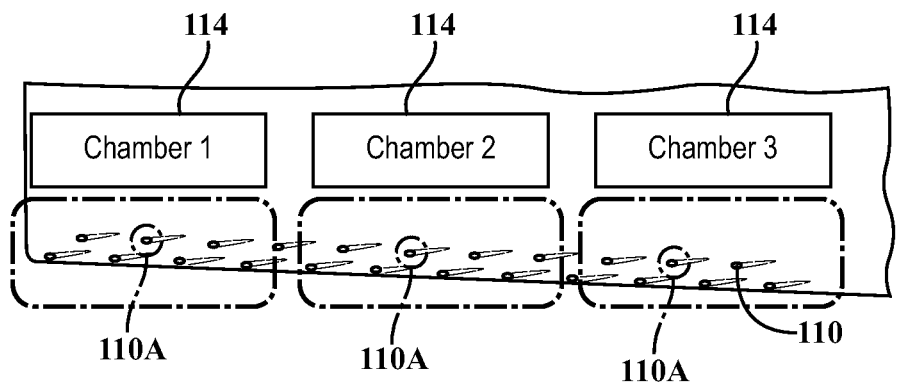
FIG. 7 is an expanded perspective view of a leading edge of the airfoil of FIG. 4.

The multiple of leading edge chambers 114 within the airfoil 84 in this example communicate through an example pattern of forty-eight apertures 110 that are drilled in groups of 16 holes (FIG. 7) separated into three leading edge chambers 114 of a leading edge cavity 122. The apertures 110 provide for cooling air egress to an external surface of the airfoil 84. It should be appreciated that although particular features are delineated within certain general areas, the features may be otherwise arranged or intermingled and still not depart from the disclosure herein. It should also be appreciated that various feed passage architectures; cavities and internal feature arrangements, e.g., pedestals, chevrons, pin fins, chevrons, etc., for the array of internal passageways 108 may also be provided.

In this particular example, to improve a flow of a blocking material such as a laser blocking material or water jet blocking material and thereby achieve a complete fill to the tip of the blade 84, at least one aperture 110A is first drilled at strategic locations in each of the multiple of leading edge chambers 114 by a process different than utilized to drill the remainder of the apertures 110. That is, in this example, the at least one aperture 110A is one of the pattern of sixteen apertures 110 of each chamber 114, but is drilled by a process other than the process utilized for the remainder of the apertures 110. The at least one aperture 110A drilled by a first process, such as by an EDM drilling process, casting, additive manufacture process, or other process provides a vent hole for each of the leading edge chambers 114 for the subsequent fill of blocking material.

The at least one aperture 110A improves the flow of the blocking material, such as that selected from the polyolefin family, and thereby facilitates full internal fill of the blocking material into each chamber 113. That is, the at least one aperture 110A, for example, allows the entrapped gases from the injection of the blocking material to be quickly dissipated and the resulting void to be filled by the blocking material, while still in the liquid state. This relatively rapid displacement of the gas allows the injection of the blocking material to fully flow into each airfoil cavity while still in the liquid state to allow for full internal cavity coverage and no internal voids caused by entrapped gasses.

Figure 8:
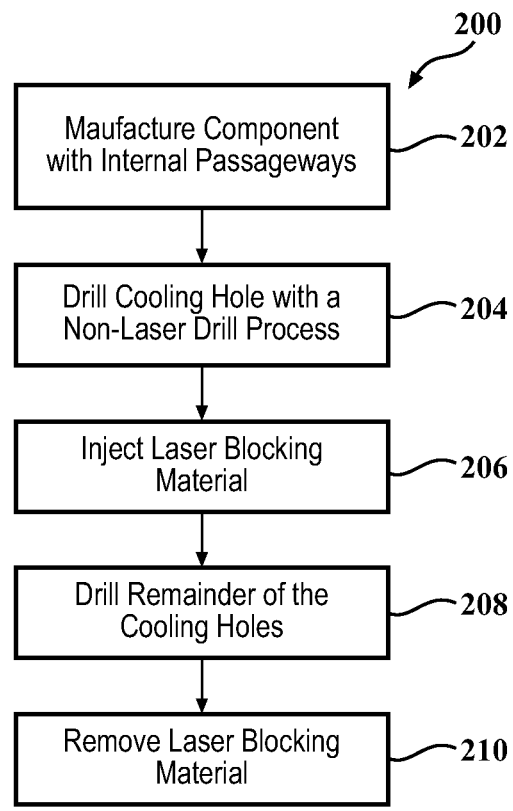
FIG. 8 is a block diagram of method for disposing blocking material within an interior of a component for blocking a beam of radiation from a laser during a laser drilling operation.

With reference to FIG. 8, an example method 200 for disposing blocking material within an interior of a component for blocking a beam of radiation from a laser during a laser drilling operation is schematically illustrated. It should be appreciated that other processes that utilize a blocking material such as a water jet process will also benefit herefrom. The steps of the method 200 are schematically disclosed in terms of functional block diagrams as a flowchart of steps. It should be appreciated that alternative of addition steps may be provided without departing from the teaching herein.

Initially, a component, such as the blade 84, is manufactured such as via casting (step 202). It should be appreciated that various casting, machining, etc., may be initially performed to form the array of internal passageways 108, such as the feed passage 112 that communicates airflow into the multiple of leading edge chambers 114 within the airfoil 84.

Next, the at least one aperture 110A is drilled at strategic locations in each of the multiple of leading edge chambers 114 by a process other than that of a laser drill process (step 204). The strategic location may include, for example, the furthest point from the injection location or where gases may be trapped. The at least one aperture 110A is drilled by an additive or subtractive manufacturing method other than via a laser drilling process such as EDM. The at least one aperture 110A allows for a more direct route for the entrapped gases in the internal chamber to escape which results in a more robust method that is less reliant on having tight controls over temperature, pressure, and part orientation.

Figure 9:
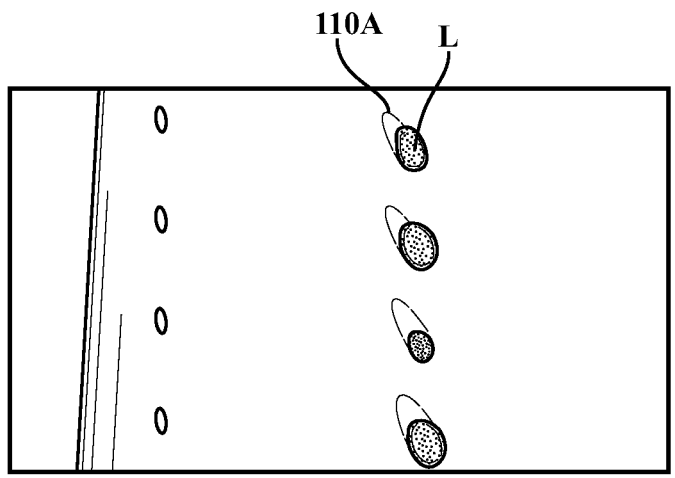
FIG. 9 is a expanded perspective view of the airfoil of FIG. 4 showing of the blocking material.

Next, the blocking material is injected into the multiple of leading edge chambers 114 such as via the feed passage 112 and the array of internal passageways 108 (step 206). Passage of the entrapped gases from the blocking material through the at least one aperture 110A that operates as a vent permits the blocking material to be readily received into complex, narrow, and/or dead end chambers. Some blocking material "L" typically excretes partially through the at least one aperture 110A (FIG. 9). This advantageously operates as verification that a complete fill has been achieved.

Next, the remainder of the apertures 110 are laser drilled (step 208). Drilling the remainder of the apertures 110 with a laser provides an efficient and effective method to accurately drill the numerous apertures 110. During the drilling of a hole with a laser beam, the coherent radiation of the laser beam vaporizes a wall, of the airfoil, such as the suction wall 42 or pressure wall 44, to form a cooling air hole 110. As the laser beam breaks through the wall on the interior of the airfoil, the laser beam strikes the blocking material disposed on the interior of the airfoil. The blocking material is particularly effective at preventing the laser beam from unacceptably damaging the walls on the interior of the airfoil.

Finally, the blocking material is removed (step 210). One process to remove the blocking material is to heat the blocking material until it melts. A particular advantage of a polyolefin family and particularly polyethylene is the polymer breaks down to form a highly combustible gas which is very clean burning. The carbon and hydrogen of the polyethylene combine with oxygen from the combustion atmosphere to form carbon dioxide and water vapor. This leaves behind a very clean airfoil that does not require further processing to remove contaminants from the interior of the airfoil.

The method 200 for disposing blocking material within an interior of a component for blocking a beam of radiation from a laser during a laser drilling operation addresses some limitations of current methods; reduces internal wall strikes and through wall break through; is verifiable with respect to ensuring that the cavity has been fully filled with blocking material prior to drilling; and may be utilized with existing equipment used for filling so is easily incorporated into existing and future parts and does not require the development of new manufacturing equipment/tooling.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method for disposing a blocking material within an interior of a component, the method comprising:

forming at least one aperture of a multiple of apertures in communication with a cavity within a component via a first process;

filling the cavity with a blocking material subsequent to forming the at least one aperture formed via the first process and prior to forming the remainder of the multiple of apertures via a second process different than the first process, wherein the second process is a laser drilling process and the at least one aperture allows a route for entrapped gasses from the blocking material to escape the cavity; and forming the one of the multiple of apertures formed via the first process a maximum distance from where the blocking material is injected into the cavity.

2. A method for disposing a blocking material within an interior of a component, the method comprising:

forming at least one aperture of a multiple of apertures in communication with a cavity within a component via a first process; and filling the cavity with a blocking material subsequent to forming the at least one aperture formed via the first process and prior to forming the remainder of the multiple of apertures via a second process different than the first process, wherein the second process is a laser drilling process and the at least one aperture allows a route for entrapped gasses from the blocking material to escape the cavity; and filling the cavity with a blocking material until the blocking material at least partially excretes through the one aperture formed via the first process.

3. A method for disposing a blocking material within an interior of a component, the method comprising:

forming at least one aperture of a multiple of apertures in communication with a cavity within a component via a first process; and filling the cavity with a blocking material subsequent to forming the at least one aperture formed via the first process and prior to forming the remainder of the multiple of apertures via a second process different than the first process, wherein the second process is a laser drilling process and the at least one aperture allows a route for entrapped gasses from the blocking material to escape the cavity, wherein the one aperture formed via the first process is at a maximum distance from where a blocking material is injected into the cavity.

4. A method for disposing a blocking material within an interior of a component, the method comprising:

forming at least one aperture of a multiple of apertures in communication with a dead end cavity via a first process;

filling the dead end cavity with a blocking material subsequent to forming the at least one aperture formed via the first process;

forming the remainder of the multiple of apertures in communication with the dead end cavity via a second process subsequent to filling the dead end cavity with the blocking material, the second process comprising a laser drilling process; and forming the one of the multiple of apertures formed via the first process a maximum distance from where the blocking material is injected into the cavity.

5. A method for disposing a blocking material within an interior of a component, the method comprising:

forming at least one aperture of a multiple of apertures in communication with a dead end cavity via a first process;

filling the dead end cavity with a blocking material subsequent to forming the at least one aperture formed via the first process;

forming the remainder of the multiple of apertures in communication with the dead end cavity via a second process subsequent to filling the dead end cavity with the blocking material, the second process comprising a laser drilling process; and forming the one of the multiple of apertures formed via the first process at a location to provide a vent for the blocking material.

6. A method for disposing a blocking material within an interior of a component, the method comprising:

forming at least one aperture of a multiple of apertures in communication with a dead end cavity via a first process;

filling the dead end cavity with a blocking material subsequent to forming the at least one aperture formed via the first process; and forming the remainder of the multiple of apertures in communication with the dead end cavity via a second process subsequent to filling the dead end cavity with the blocking material, the second process comprising a laser drilling process, wherein the cavity includes a multiple of chambers, each of the chambers including one of the multiple of apertures formed via the first process.

* * * * *